US006671633B2

(12) United States Patent
Kramb et al.

(10) Patent No.: US 6,671,633 B2
(45) Date of Patent: Dec. 30, 2003

(54) MODULAR MONITORING AND PROTECTION SYSTEM WITH AUTOMATIC DEVICE PROGRAMMING

(75) Inventors: Kevin E. Kramb, Lebanon, OH (US); David P. Trumpy, Cincinnati, OH (US); Patrick F. Carle, Austin, TX (US); Dan R. Shupe, Milford, OH (US)

(73) Assignee: Entek IRD International Corporation, Milford, OH (US)

( * ) Notice: Subject to any disclaimer, the term of this patent is extended or adjusted under 35 U.S.C. 154(b) by 29 days.

(21) Appl. No.: 10/144,600

(22) Filed: May 13, 2002

(65) Prior Publication Data

US 2003/0212504 A1 Nov. 13, 2003

(51) Int. Cl.⁷ .............................................. G06F 19/00
(52) U.S. Cl. .......................... 702/34; 702/54; 702/56; 702/189; 702/190
(58) Field of Search ............................ 702/33, 34, 54, 702/56, 57, 66, 69, 71, 73, 182–186, 188, 189, 190, 191; 73/117.2, 117.3, 118.1, 579, 593, 660; 700/78–79, 169, 259, 280

(56) References Cited

U.S. PATENT DOCUMENTS

| | | | | |
|---|---|---|---|---|
| 4,422,140 A | * | 12/1983 | Keats | 700/79 |
| 4,929,874 A | * | 5/1990 | Mizuno et al. | 318/128 |
| 5,255,565 A | * | 10/1993 | Judd et al. | 73/579 |
| 5,324,915 A | * | 6/1994 | Adams et al. | 219/494 |
| 5,544,080 A | * | 8/1996 | Kobayashi et al. | 700/280 |
| 5,870,699 A | * | 2/1999 | Canada et al. | 702/190 |
| 6,330,515 B1 | * | 12/2001 | Wettstein | 702/56 |

* cited by examiner

*Primary Examiner*—Bryan Bui
(74) *Attorney, Agent, or Firm*—Michael G. Fletcher; Alexander M. Gerasimow; William R. Walbrun

(57) ABSTRACT

Monitoring modules of a monitoring and protection system are disposed in groups proximate to points of interest in a machine system where dynamic operating conditions are monitored. A master module, which may be a similar monitoring module or a different device such as a gateway, stores user configuration parameters that are also stored in the monitoring modules. In the event of loss of service or replacement of a module, once the same or a different module is detected by the master, the configuration parameters are restored to the monitoring module to permit continuity of operation. The parameters may include multiple settings such as alarm levels, units of measure, processing parameters, response settings, and so forth.

31 Claims, 7 Drawing Sheets

MODULAR MONITORING AND PROTECTION SYSTEM WITH AUTOMATIC DEVICE PROGRAMMING

BACKGROUND OF THE INVENTION

The present invention relates generally to the field of systems for monitoring and protection of mechanical systems. More particularly, the invention relates to a technique for automatically programming or reprogramming multiple user defined configuration parameters in monitoring modules employed in such systems.

In the field of industrial equipment monitoring and protection, a wide range of components and systems are known and presently in use. Depending upon the nature of the underlying mechanical system, the monitoring and protection components may generate various signals representative of dynamic conditions. The signal-generating components are typically sensors and transducers positioned on or otherwise closely associated with points of interest of the machine systems. The signals are applied to monitoring circuits, typically somewhat remote from the points of interest, and are used to analyze the performance of the machine system. Machine systems thus instrumented may include rotary machines, assembly lines, production equipment, material, handling equipment, power generation equipment, as well as many other types of machines of varying complexity.

A variety of unwanted conditions may develop in machine systems that can occur rapidly, or develop over time or in certain situations, such as loading or due to wear or system degradation. Where unwanted conditions appear, various types of response may be warranted. For example, the response of the monitoring and protection components to different dynamic conditions may differ greatly depending upon the machine system itself, its typical operating characteristics, the nature of the system, and the relative importance of the conditions that may develop. Such responses may range from taking no action, to reporting, to logging, to providing alerts, and to energizing or de-energizing parts or all of the machine system.

By way of example, one type of condition that may be monitored in rotary and other dynamic machine systems is vibration. Information indicative of vibration may be collected by accelerometers on or adjacent to points of interest of a machine, and conveyed to monitoring or control equipment. The information from the accelerometers is not typically useful in its raw form, and must be processed, analyzed, and considered in conjunction with other factors, such as operating speeds, to determine the appropriate response to existing or developing conditions.

The operation of such monitoring components is typically programmed prior to or at the time the components are placed in service. In the event of failure or servicing of a component, the new or serviced component must generally be reprogrammed, at considerable time and expense. Such reprogramming may also lead to downtime for the component or for a portion or all of the machine system itself, entailing additional expense. Moreover, where a significant number of values and settings are programmable in a monitoring component, these may need to be entirely regenerated, or records located indicating the programmed settings must be found before reprogramming the new or serviced component.

There is a need for a more reliable and straightforward approach to reprogramming components of distributed monitoring and protection systems. Moreover, there is a need for systems that can accommodate replacement of individual components having a large number of user-configured settings in a relatively short time and with minimal disruption to other parts of the system.

SUMMARY OF THE INVENTION

The present invention provides a system design and programming technique that responds to such needs. The technique may be used in a wide range of settings, but is particularly well suited to industrial monitoring equipment in which individual monitoring modules are positioned in proximity to points of interest in complex machine systems. The monitoring modules may be of any suitable type, although in a present implementation at least some of the modules allow for control or protection functions, such as the control of the operative state of a relay circuit that may be integrated directly into the modules. The control and protection functions are at least partially defined by the configuration settings programmed into the individual modules.

The technique allows for multiple diverse settings or configuration parameters to be set in the individual modules by a user. Thus, the overall system and the individual components may be adapted to the specific application. The configuration parameters may define such settings as alarm limits, system settings, units of measurement, normal and abnormal operating levels, and so forth. The configuration parameters are stored both in the monitoring modules and in a master module for each group of modules. The monitoring modules and the master, which may be another monitoring module or a different type of device such as a gateway, may communicate with one another via an open industrial data exchange protocol. Upon loss of service of or signals from a monitoring module, and return to service of a different or the same module, the master module automatically restores the configuration settings to the module to permit continuity of functionality without the need to manually reprogram the monitoring module.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
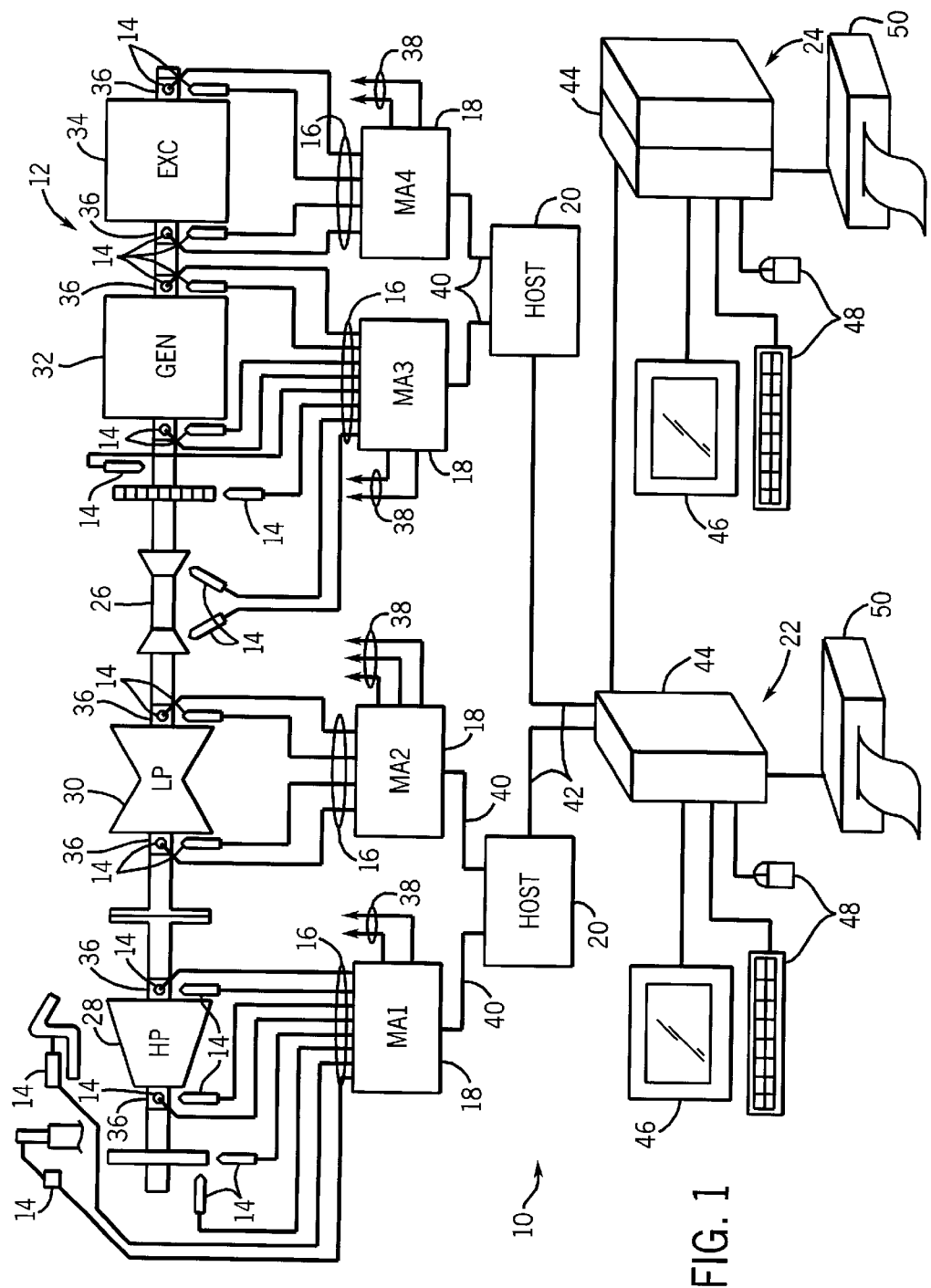
FIG. 1 is a diagrammatical overview of a machine system employing a module monitoring and protection system in accordance with aspects of the present technique.

Turning now to the drawings, and referring first to FIG. 1, a diagrammatical overview is illustrated of a monitoring and protection system 10 applied to an exemplary machine system 12. The monitoring and protection system 10 is particularly well-suited for detecting, monitoring, and controlling a wide range of dynamic operating parameters of machine systems. In particular, the system is well-suited to various types of rotary equipment, although other applications may be envisaged for certain aspects of the present technique. As used herein, the term "dynamic operating condition," or the reference to dynamic conditions in general, is intended to convey physical conditions or parameters of a machine system, as opposed, for example, to electrical conditions. The dynamic conditions may include such characteristics as vibration, rotation, speed, temperature, pressure, and so forth.

The monitoring and protection system 10 is designed to permit selective monitoring of dynamic operating conditions and parameters at various points along a machine system. In general, these points will correspond to locations at which such parameters can be sensed, and may be separated, independent or quite distal from one another. In the implementation illustrated in FIG. 1, for example, the mechanical system 12 generally represents a power generation system in which a wide range of dynamic operating conditions are monitored on a continual basis for informational, protection and control purposes. Accordingly, the monitoring and protection system 10 includes a series of sensors, detectors or transducers 14 mounted near or on various points of the machine system to detect the desired dynamic operating conditions. Communication lines 16 extend from the various sensors and transducers to monitoring assemblies 18.

The monitoring assemblies may be placed proximate to, adjacent to, or relatively close to the various monitored locations or points, and need not be grouped as in certain heretofore known systems. Certain of the monitoring assemblies, which will be described in greater detail below, may be linked via hosts 20. The hosts, or the monitoring assemblies directly, may be linked to central or remote monitoring stations 22 and 24 both within a plant or installation, or remote from the plant or installation. Typically, the monitoring assemblies 18 will be mounted closely adjacent to specific points or locations which are monitored, while hosts, if present, will be positioned near groups of monitors, or adjacent to a monitoring assembly. The central or remote monitoring station is typically provided in a desired plant location, such as a control room, for programming, monitoring, protection and control functions.

In the exemplary mechanical system 12 illustrated in FIG. 1, rotary shafting 26 links a series of functional sections of the system, including a high pressure turbine section 28, a low pressure turbine section 30, a generator 32 and an exciter 34. As will be appreciated by those skilled in the art, the shafting and various components of the system are supported by a series of bearings 36. Other components may clearly be included in the system, although the representation of FIG. 1 has been intentionally simplified for explanatory purposes.

Throughout the present discussion it should be borne in mind that the turbine mechanical system of FIG. 1 is simply an example of one application. The present technique may be applied in a wide range of industrial settings, including to material handling applications, production equipment, assembly stations and lines, just to name a few. Moreover, the various components of the mechanical system need not be linked by single shafting, but may be disparate and linked only functionally in the overall system design. In the case of a turbine system, however, the various sensors, transducers, monitors, and other components of the system may form part of a turbine supervisory instrumentation system.

The various sensors and transducers 14 of the monitoring and protection system 10 may produce a wide range of signals based upon the detected dynamic operating conditions. Each generates one or more signals which is applied to monitors within each monitoring assembly 18 via the communication lines 16. The various transducers may be active or passive, and may receive power for operation via the communication lines. By way of example, the sensors and transducers of the instrumented turbine system of FIG. 1 may detect dynamic operating conditions such as valve position and case expansion, as indicated diagrammatically to the upper left in FIG. 1, eccentricity, bearing absolute casing vibration, both in X and Y directions, differential expansion, speed of rotation, rotational phase, and so forth. As will be noted by those skilled in the art, various sensors and transducers may be employed for these purposes, including linear variable differential transformers, non-contact pickups, rotary potentiometers, accelerometers, and so forth. Indeed, in a present implementation, the particular configuration of monitors within the monitoring assemblies includes a specially adapted vibration monitor designed to be coupled to a tachometer and to an accelerometer. Such accelerometers may detect, for example, signals indicative of shaft, casing or pedestal vibration, depending upon the application.

The monitoring assemblies 18 serve generally to receive, process, report and act upon the signals supplied by the sensors and transducers. For example, specific monitors within the assemblies may process input signals to produce vibrational data which is used to analyze the performance or operating conditions of the mechanical system. Where desired, and as described more fully below, specific processing of this type may be implemented via the monitors of each or certain monitoring assemblies, and closed-loop protection of the equipment may be provided, such as to energize or de-energize the components or a single component of the system. As will be appreciated by those skilled in the art, certain of the monitored dynamic operating conditions may be particularly indicative of abnormal and unwanted conditions, such as wear, impending failure, unbalance, excessive loading, and so forth. Also as described more fully below, certain of the monitors within the monitoring assemblies may be designed to energize or de-energize an internal or external relay or similar switch to permit rapid control and protection functions. It should be noted that, as used herein, the term "relay" applies generally to a variety of switching devices which may be controlled by the monitoring modules, such as conventional electromechanical devices, solid state devices, as well as other switching systems.

In addition to processing and analysis within the monitors of each monitoring assembly, each monitoring assembly may generally provide outputs for external devices as indicated at reference numeral 38 in FIG. 1. The outputs may include electrical signals which can be applied to dedicated components, such as motors, alarms, lights, valves, and so forth. These outputs are generated based upon the monitoring and analysis functions performed by the monitoring modules and, depending upon the programming of the various modules, with input from remote devices such as the other monitoring assembly modules or a central or remote monitoring station.

As described more fully below, the monitors or monitoring modules of the present technique make use of an open industrial data exchange protocol for the exchange of information both between monitoring modules within each monitoring assembly, and between the modules of different monitoring assemblies, and may use the same protocol for the exchange of data with remote devices such as hosts and central or remote monitoring stations. As used herein, the term "open industrial data exchange protocol" generally refers to a non-proprietary and non-fee based scheme for formatting and transmitting data traffic between independent devices. A variety of such protocols have been developed and are presently available, including protocols designated generally in the industrial field as DeviceNet, ControlNet, Profibus and Modbus. Certain of such protocols may be administered by industry associations or bodies to ensure their open nature and to facilitate compliance with the protocol standards, such as the Open DeviceNet Vendors Association. It has been found that the use of a standard open industrial data exchange protocol for some or all of the communications between the modules, between assemblies, and between remote devices and the modules and assemblies, greatly enhances the interchangeability and applicability of the present system in various settings. Moreover, as described more fully below, the use of the open industrial data exchange protocol permits the individual monitoring modules to be easily interfaced in a completely modular and independent fashion without the use of a traditional backplane architecture.

Due to the use of the open industrial data exchange protocol, the monitoring assemblies, and the various modules within the assemblies, may be linked to one another via standard network media 40, illustrated between the monitoring assemblies 18 and the host 20 in FIG. 1. Similar media may be routed both within each monitoring assembly, and between assemblies. While any suitable media may be employed for this purpose, for data exchange only, a two-conductor or shielded cabling system maybe employed. Where, as in the present system, data and power may be provided at certain locations, a conventional network media such as a four-conductor cable may be applied for network media 40. In the present embodiment, the media may include both power and data conductors disposed in a flat insulating jacket designed to interface the conductors with devices by conventional termination and by insulation displacement connectors. Further network media 42 serve to link the monitoring assemblies or hosts with remote monitoring equipment. It should be noted that the media 40 and 42 may be identical where desired.

Those skilled in the art will recognize that the topology afforded by the present technique presents distinct advantages in terms of the physical media employed to connect the various components of the system. For example, conventional sensor or transducer wiring may be routed to the various monitoring assemblies, with internal wiring within the monitoring assemblies being greatly simplified by the use of an open industrial data exchange protocol and by the interfacing of individual modules as described below. Moreover, due to the de-centralized or distributed nature of the monitoring modules and monitoring assemblies in the topology, individual monitoring modules and assemblies may be placed local to specific points of interest in the machine system, with no need to route complex and bulky physical media to a central station or bank for interfacing with a conventional backplane-based monitoring assembly.

The various centralized or remote monitoring stations 22 and 24 may include any suitable equipment, such as general purpose or application-specific computers 44, monitors 46, interface devices 48, and output devices 50. Although simple computer systems are illustrated diagrammatically in FIG. 1, those skilled in the art will recognize that the centralized or remote monitoring stations may include highly complex analytical equipment, logging equipment, operator interface stations, control rooms, control centers, and so forth. As noted above, while at least one such monitoring station will typically be provided at or near the application, other stations may be provided entirely remote from the application, such as for monitoring plants, lines, production equipment, offshore facilities, and the like from entirely remote access points.

Figure 2:
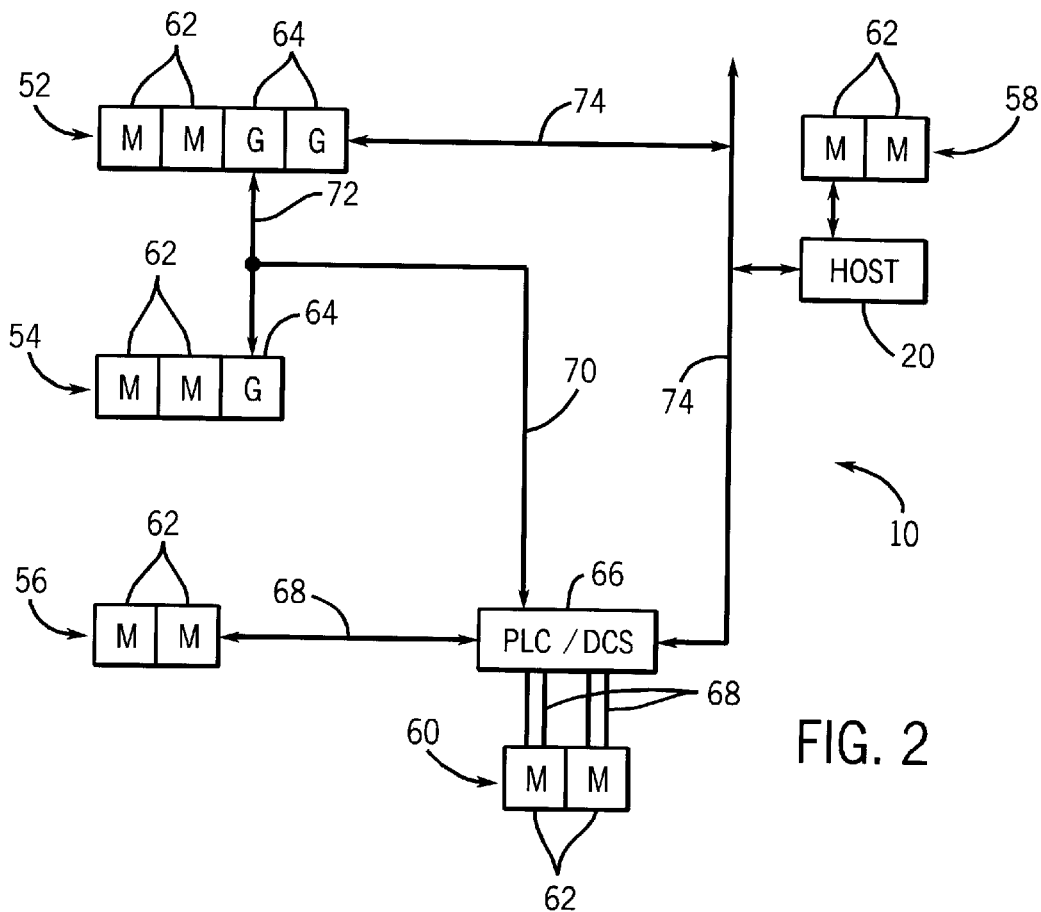
FIG. 2 is an exemplary topology for modules and related equipment for use in a machine system of the type shown in FIG. 1.

FIG. 2 illustrates an exemplary topology for a monitoring and protection system 10 in accordance with aspects of the present technique. In the topology of FIG. 2, modular monitors are associated in groups 52, 54, 56, 58 and 60. Each group may contain as few as a single monitor, and as many associated monitors as necessary at a desired point of interest of the machine system. Again, the individual monitors, designated generally by reference numeral 62 in FIG. 2, are designed to communicate data between themselves in accordance with an open industrial data exchange protocol, and are individually mounted and interfaced without the use of a conventional communications backplane. The monitoring module groups may further include one or more gateways configured to receive or monitor signals from the monitoring modules and to convey corresponding signals, in accordance with the same or a different data exchange protocol, to remote devices. For example, gateways 64 may afford data exchange in accordance with different open industrial data exchange protocols, enabling the use of multiple such protocols within the system, such as two or more of the protocols mentioned above. Other gateways may provide for easily interfacing external devices, including programmable logic controllers or digital control systems 66.

In the overall topology, then, certain of the monitoring devices or modules may be in direct communication with a remote or central monitoring and control station, such as a PLC or DCS 66, as indicated by data lines 68 in FIG. 2. Other communications may be provided to such devices as indicated at data lines 70, such as through branch lines 72 interconnected with appropriate gateways within the monitoring groups. Similarly, gateways 64 may provide for communication in accordance with further exemplary protocols, such as Ethernet or Internet protocols. Appropriate communications lines 74 are provided in these cases, and may be interfaced with the PLC or DCS 66 and with one or more hosts 20. In the case of Ethernet or Internet protocols, remote lines may be provided for data exchange with devices both within a facility and quite remote from the facility, such as via the Internet.

As noted above, in addition to facilitating the truly modular nature of the present system without reliance upon a conventional backplane architecture, the use of an open industrial data exchange protocol facilitates the exchange of data between monitoring groups or assemblies. Benefits of such topologies will readily appear to those skilled in the art. For example, the absence of a conventional backplane may effectively reduce the cost and size of the overall system, particularly where few monitoring modules are employed at specific locations of interest. Moreover, the overall system topology is inherently expandable and contractible to fit a particular application, with one or more monitoring modules being easily added to the system at designated locations of interest along the machine system. Moreover, as noted above, the use of network media for communicating signals between disparate and separated monitoring groups rather than a central rack-type monitoring station greatly reduces the cost and complexity of interconnections in the overall system, and specifically of wiring between the various sensors and a conventional central rack.

Figure 3:
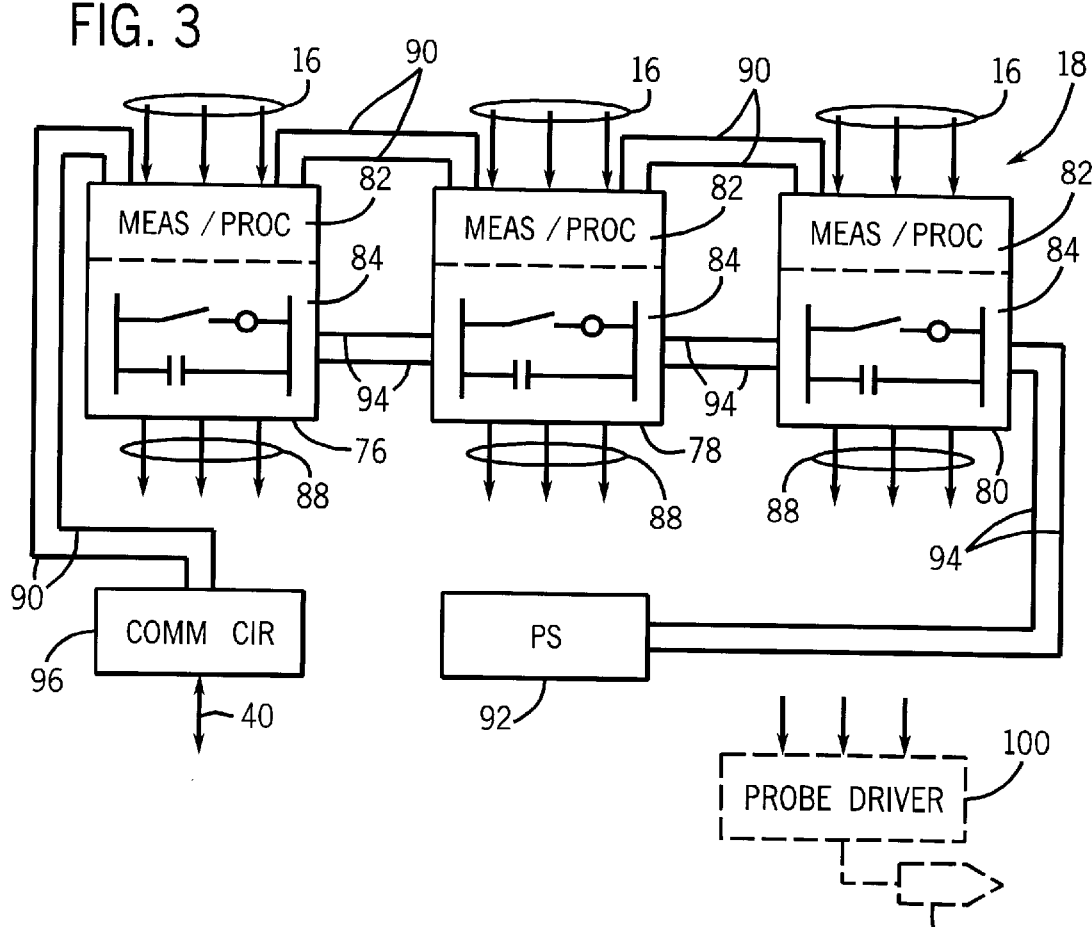
FIG. 3 is a diagrammatical representation of a series of associated modules in a group.

As mentioned above, in specific implementations, the monitoring modules may perform desired measurement and processing functions, and may also serve to energize or de-energize components of the machine system. FIG. 3 illustrates diagrammatically several monitoring modules within a monitoring group or assembly 18 of the type illustrated in FIG. 1. In the illustrated example, the monitoring assembly 18 includes a series of monitoring modules 76, 78 and 80. Each of the modules in the illustrated embodiment receives input signals at lines 16 and includes a corresponding signal processing section 82, and a relay portion 84. The processing section 82 includes circuitry for receiving, processing, and acting upon signals received from the various sensors and transducers. In a present implementation, for example, processing includes analysis of received signals for determination of vibrational data, such as via a Fast Fourier Transform. As described more fully below, each monitor may include specialized processors adapted for these functions, as well as memory circuitry for storing configuration parameters in processing routines.

Based upon such processing, output signals may be produced and provided at output 88 in a manner described above, such as for controlling external relays, alarms, lights, LEDs, and other devices. At least certain of the monitors in a present embodiment further include an integrated relay 84 which may produce output signals in a similar manner, such as for completing or interrupting a current carrying path through a load, such as a motor control device, starter, valve, indicator light, alarm, and so forth. It has been found that integration of a relay directly in monitoring modules which can be much closer to the actual monitored points of interest, affords extremely rapid response times. In particular, it has been found that conformity with industry standards for protective devices, such as American Petroleum Institute (API) standard 670 can be met easily through the present monitoring system design and topology.

As mentioned above, to avoid the need for a conventional backplane, the monitors and monitoring modules of the present system are designed to exchange data in accordance with an open industrial data exchange protocol. Indeed, this protocol is said to provide the "backbone" of the system, as opposed to the communication backplane of conventional systems. Accordingly, data links, represented generally by reference numeral 90 in FIG. 3 are provided between the monitoring modules. Various physical configurations for such links may be envisaged. Conventional wiring may be provided, such as through terminated wires or insulation displacement-type connectors. In a present embodiment, however, data links are provided between the modules by use of interconnecting terminal bases as described more fully below. Each individual module, then, is adapted for data exchange in accordance with the adopted protocol. The monitoring assembly 18 may further include power supply 92, typically providing constant voltage DC power, typically in the order of 24 volts. Alternatively, the media providing network links to the individual monitoring assemblies may provide for power needs as well, such as through a power and data cable. Power supply lines 94 are routed to the individual monitoring modules, such as through the interfaced terminal bases.

To permit routing of signals to external devices, one or more communications circuits 96 may be provided within the monitoring assembly. In the foregoing arrangements, for example, the communications circuit 96 included a gateway which may be used to communicate data to remote locations via the same open industrial data exchange protocol used between the modules, or via a different protocol. It should be noted that a wide range of other devices may be provided in the assembly. The monitors themselves may be specifically adapted for certain functions, including vibration monitoring, speed monitoring, temperature monitoring, pressure monitoring, and so forth. Other devices may then include relay modules comprising one or more individual relay circuits controlled by the monitors, and probe drivers such as illustrated at reference numeral 100 in FIG. 3. Such probe drivers will typically provide power to probes or sensors 102 which are linked to the individual monitors.

Figure 4:
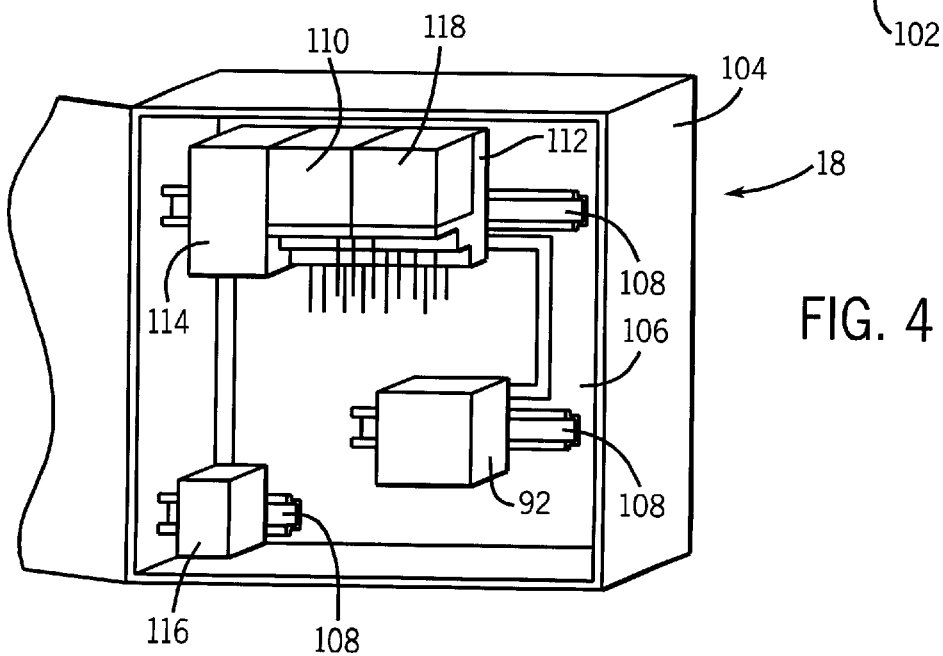
FIG. 4 is an exemplary physical configuration of modules within an enclosure, such as at a desired machine location.

As mentioned above, the present monitoring system design and topology facilitate the free association of independent and modular monitors at points of interest around a machine system to monitor and control dynamic operating conditions. FIG. 4 illustrates a typical installation for one such group or assembly of devices at a machine location. In a present embodiment, the various monitors and associated devices are adapted for mounting in an enclosure 104, such as a conventional NEMA enclosure. A panel 106 serves for mechanical mounting of the various devices, such as through the use of DIN rails 108.

In the embodiment illustrated in FIG. 4, the components of assembly 18 include a monitoring module 110, such as a vibration monitor, one or more terminal bases 112, a gateway 114, a signal conditioning module 116 and a relay module 118. A power supply 92 is coupled to the relay module and to the monitoring module and gateway via appropriate power conductors. Each module appropriately conditions and regulates power received from the power supply. The terminal base 112, which may include a plurality of terminal bases, such as individual bases for the monitoring module and relay module, serves to receive terminated conductors for routing signals to and from the modules, such as to and from sensors, transducers, and controlled devices, such as relays, lights, alarms, and so forth. The assembly at each point of interest in the machine system may therefore be expanded or contracted by the addition of other monitoring, relay, or other modules both along a single line or group interconnected via terminal bases, or by subsequent groups interconnected with the modules at the location via conventional network media. The gateway and signal conditioning circuitry, then, serve to interconnect the various modules of an assembly or group with other modules of different assemblies or groups, or directly with a central or remote monitoring station or host.

Figure 5:
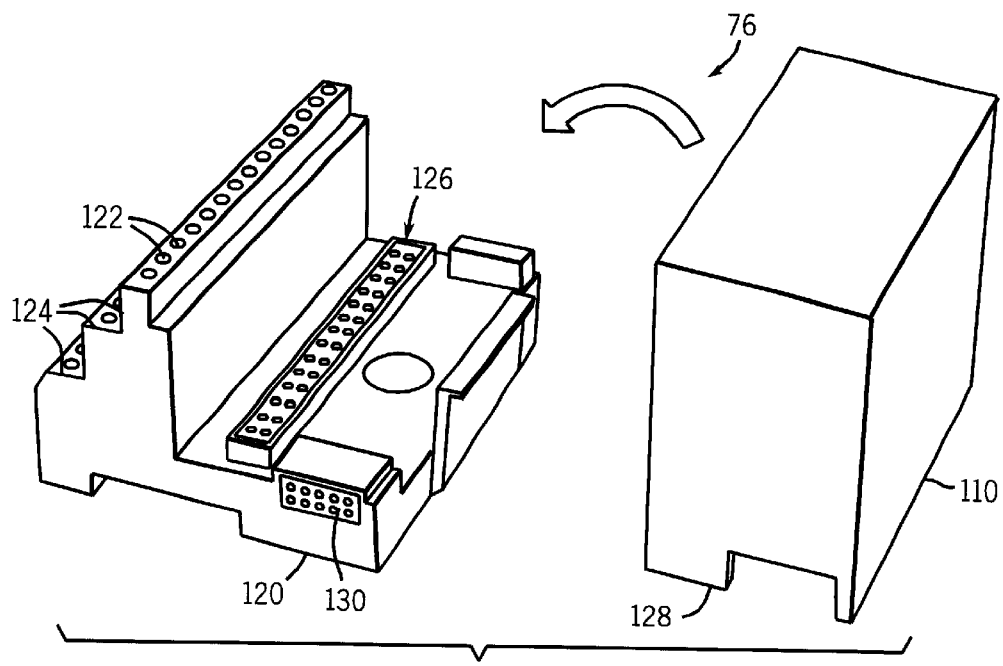
FIG. 5 is a perspective view of an exemplary module implementation for accepting a monitoring module on a standard interface that communicates with similar interfaces and modules via the present technique.

FIG. 5 illustrates a simplified perspective view of an actual monitoring module 76 and its terminal base. In the illustration of FIG. 5, the terminal base 120 serves to mechanically mount the module on a support structure, such as a DIN rail. Terminals 122 are provided for terminating conductors, such as data and power conductors used to transmit signals to and from the monitoring module. The terminals may be provided in tiers 124 to facilitate the use of a substantial number of terminations, 52 such terminations being provided for each terminal base in the present embodiment. An interface 126 is provided in the terminal base for receiving a monitoring module 110. The interface 126 includes connections for the various power and signal lines needed for the monitoring module, with the monitoring module including a similar electrical interface along a bottom side thereof. The monitoring module interface 128 thus simply plugs into the terminal base for completion of all necessary connections. For interfacing the various monitoring, relay and other modules of a group or assembly, then, a terminal base interface 130 is provided. In the illustrative example of FIG. 5, the interface 130 is extendable and retractable from the side surface of the terminal base, and, when extended, plugs into a conforming receptacle within an opposite side of a similar terminal base. Necessary connections for data exchange in accordance with the open industrial data exchange protocol are then provided between the interface modules via the respective terminal bases.

Figure 6:
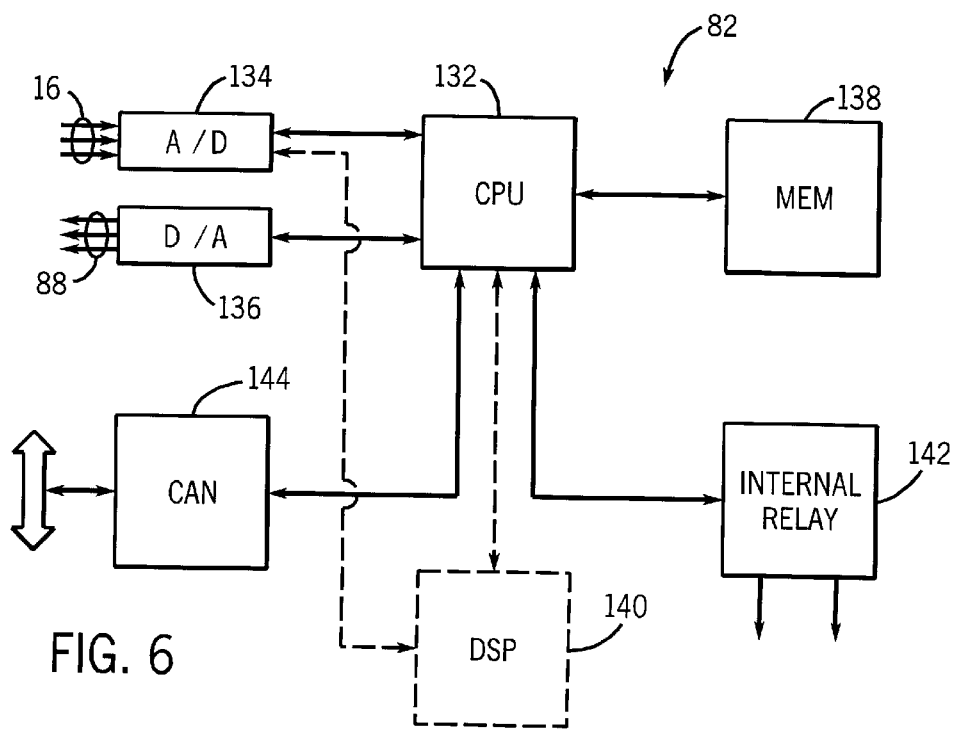
FIG. 6 is a diagrammatical representation of exemplary functional components of a module for performing and monitoring and/or protection functions.

As noted above, the individual monitoring modules include a circuitry designed to permit them to receive signals from sensors and transducers, and to process the signals and act upon the signals in accordance with predetermined routines. FIG. 6 illustrates an exemplary configuration of functional circuitry within a monitoring module in accordance with the present technique. As illustrated in FIG. 6, the monitoring module processing circuitry 82 includes a CPU 132 designed to carry out data management functions, to coordinate the exchange of data, and to control certain processing functions. An analog-to-digital converter 134 receives input signals as indicated at reference numeral 16, converts the input signals to digital signals and applies these signals to the CPU 132 or DPS 140. In a present embodiment, a 24 bit, 96 ksample/second converter provides extremely high resolution for the calculations made within the monitoring modules, although other sampling rates may be employed. Similarly, a digital-to-analog converter 136 receives digital signals from the CPU 132 and provides output signals as indicated at reference numeral 88, such as for monitoring, analysis or recording systems. A memory circuit 138 stores configuration parameters and codes, as well as routines implemented by the CPU 132. Such routines may include analysis of received signals, such as to determine vibrational data, including vibrational profiles as described more fully below. The routines may also include code for analyzing and comparing data to preset alarm limits or advisory limits. Moreover, the processing code stored within memory circuit 138 may permit comparison of various signals or value levels, flags, alarms and alerts, and similar parameters within a single monitor or with signals received from other monitors or remote monitoring and control equipment, such as to define voting logic for energization or de-energization of devices within the system.

It should be noted that a wide variety of configuration parameters may be stored within each monitoring module. For example, sensor or transducer parameters may include the transducer type, its sensitivity, units of measure, low and high fault settings, DC bias time constants, and so forth. In vibration monitoring modules, parameter settings may include such settings as channel name (for each of the multiple channels provided), output data units, high pass filter settings, full scale settings, sampling mode settings (e.g. synchronous or asynchronous), and so forth. Overall measurement parameters may also be set, such as for RMS calculations, peak calculations, peak-to-peak calculations, overall time constant calculations, damping factor calculations, as well as a range of spectrum and time waveform parameters. The latter may include values such as maximum frequency, number of lines or bins in spectrum measurements, period of waveforms, number of samples in waveform measurements, and window type (e.g. Hanning, rectangular, Hamming, flat top, and Kaiser Bessel). Band measurement parameters may also be set, such as RSS and peak signal detection settings, minimum and maximum frequencies in bands, and so forth. Similarly, various settings may be provided for speed or tachometer settings, such as for averaging, pulses per revolution, trigger mode, and so forth.

In addition to the foregoing circuitry, certain of the monitors may include a dedicated digital signal processor 140 as illustrated in FIG. 6. In a present embodiment, for example, a dedicated digital signal processor is provided for carrying out certain analysis functions, and compliments the CPU 132 in the signal processing provided in the monitoring module. In this present embodiment, vibrational data is derived from signals received by the monitoring module. The analog-to-digital converter 134 receives conditioned signals and applies these signals to the digital signal processor 140 either directly, as in a present embodiment, or indirectly such as via the CPU. Dedicated processing can be performed on the signals, such as by application of analysis routines which may include a Fast Fourier Transform to establish a vibrational profile over a range of speeds or frequencies of interest.

In a present embodiment, the CPU 132 performs functions such as control of communications, including control of data traffic over a bus, serial communications, such as for configuration of the monitoring module and memory circuitry, controls utilization of memory, and processes data from the digital signal processor 140. The CPU may also control such functions as powering up and powering down devices, and control of a relay circuit, or other internal or external device. It has been found that, where provided, the digital signal processor 140 in conjunction with the processing capabilities of the CPU 132 can greatly enhance the performance of the monitoring module both in terms of the computations that can be performed, and the rapidity with which such computations can be performed. As will be appreciated by those skilled in the art, such gains in processing capabilities can greatly enhance the responsiveness of the module to rapid changes in dynamic operating conditions.

Other circuitry which may be provided within the monitoring modules includes an internal relay 142 illustrated diagrammatically in FIG. 6. While such circuitry may also be complimented by external circuitry, such as individual relay modules as discussed above, the provision of an internal relay circuit allows the monitoring module to perform extremely rapid, locally closed-loop protective functions. Code stored within memory circuit 138 and executed by the CPU 132 may include local comparisons of processed data, such as vibrational data, speed data, temperature data, pressure data, and so forth, to pre-set or operator-configurable limits or ranges. Where such a limit is reached, extremely rapid response may be provided by the integrated relay circuitry, the state of which can be quickly altered by the CPU 132.

The CPU 132 may also implement code which causes a change in the state of the relay circuitry in response to signals received from remote sources such as other modules and central processing circuits. Effectively, then, the monitoring modules may implement protection or control loops at several levels. Firstly, at a local level, the CPU may alter the operating state of the relay circuit extremely rapidly due to detected changes in operating conditions and by comparison with desired levels or ranges. In a broader, more remote control loop, input signals may be processed and analyzed at least partially remotely, with commands for operation of the relay circuitry being transmitted from the remote location and simply implemented by the CPU or implemented by the CPU in conjunction with locally-produced analytical data.

Communications circuitry, such as control area network circuitry 144 is preferably included in each monitoring module to permit the formatting, transmission, and reception of data in accordance with the desired protocols. As noted above, the present monitoring modules preferably communicate with other modules and with external circuitry via an open industrial data exchange protocol.

As mentioned above, a present implementation of the techniques and monitoring module designs discussed herein accommodates analysis of vibrational data. Such vibrational data may be a key component in mechanical system monitoring, control and protection. In a present implementation, vibrational profiles are generated in dedicated vibration monitors based upon multiple channels of signal acquisition, from accelerometers and tachometers. The circuitry within the vibration monitors performs any suitable analysis to generate vibrational data, which may be presented as a vibration profile. Alarm or alert ranges, limits, levels, and the like may be established and combined with the vibrational data for monitoring, protection and control functions both within the monitoring module and in conjunction with other monitoring modules and control devices.

Figure 7A:
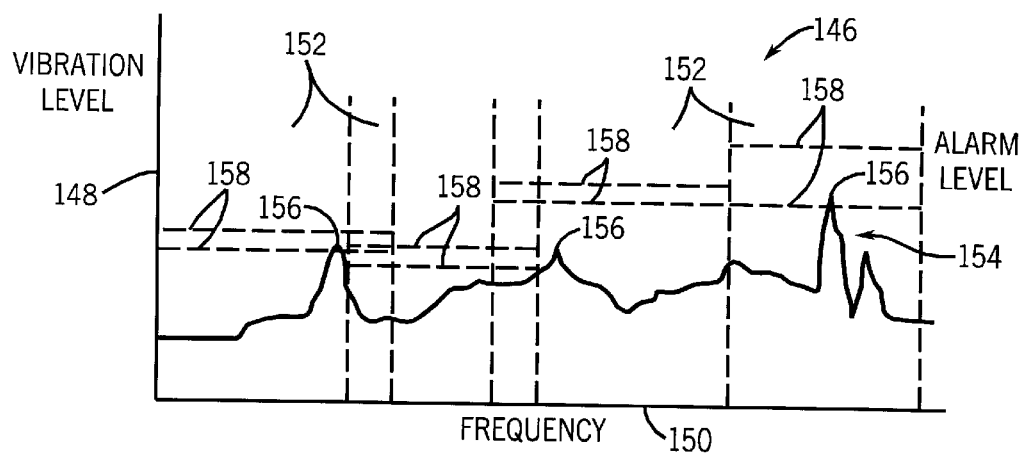
FIG. 7A is a graphical representation of dynamic parameter data, such as vibrational data, indicating a manner in which various alarm settings may be implemented and utilized.

FIG. 7A represents an exemplary vibrational profile as well as certain vibration bands and alarm levels which may be utilized in this way. In the graphical illustration of FIG. 7A, referred to generally by reference numeral 146, the magnitude of vibration, as indicated by axis 148 is displayed at various frequencies along axis 150. The frequencies may be divided into desired bands as indicated at reference numeral 152, such as by reference to actual operating frequencies of the equipment. That is, bands may be established for analysis purposes which are divided at any convenient point over a range of frequencies of interest (including overlapping or spaced apart bands. The actual vibration profile 154 extends across the bands 152 and will typically exhibit a range of magnitudes depending upon the nature and characteristics of the machine system. As will be appreciated by those skilled in the art, for example, a typical rotating machine system will exhibit certain natural frequencies which result in elevated magnitudes of vibration reaching peaks as indicated generally at reference numeral 156 in FIG. 7A.

Heretofore known devices for analyzing machine vibration typically provided an extremely limited ability to compare vibrational data with limits defining unacceptable or undesirable conditions. In the present technique, a large number of alarm limits may be set by a user through configurable parameters stored within memory circuitry 138 described above with reference to FIG. 6. FIG. 7A illustrates a number of such alarm limits indicated generally by reference numerals 158.

The alarm limits illustrated in FIG. 7A have several interesting and particularly useful characteristics. Firstly, different alarm levels may be set for different frequency bands, the limits of which may also be set, so as to allow for the specific tailoring of the monitoring and protection functions to individual systems based upon their typical or desired frequency response. Moreover, multiple alarm levels may be set by an operator for each frequency band and for the multiple frequency bands. Accordingly, the alarm levels may be configured so to define ranges such as minimum and maximum vibration levels. The configurations also permit the alarm levels to be used in various manners. By way of example, attaining certain alarm levels may result in reporting only, while attaining more elevated alarm levels may result in sounding or displaying an alarm, or in energization or de-energization of a relay circuit so as to start or stop a piece of machinery. The rapid analysis of vibrational data in this manner, for example, may be used to start or stop electric motors, switch valves, illuminate lights, sound audible alarms, and so forth.

Figure 7B:
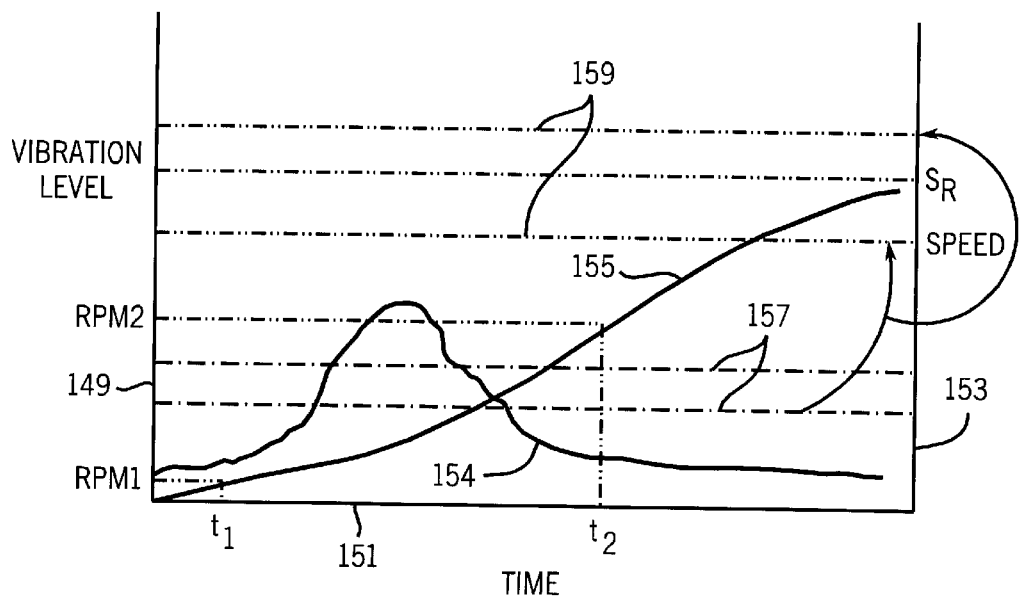
FIG. 7B is a graphical representation of a technique for multiplying or raising certain alarm settings, such as during startup or shutdown of monitored systems.

FIG. 7B illustrates an additional feature of the alarms and their utilization in the present technique. In particular, multipliers for one or all of the alarms may be utilized to avoid false alarms for other erroneous feedback during periods of operation, such as startup or shutdown. In the illustration of FIG. 7B, for example, along a time axis 151, a vibration trace, as indicated generally by trace 154, varies with the magnitude of vibration, as indicated at axis 149. The actual operating speed of the system is also represented along vertical axis 153. Accordingly, in addition to the vibration trace 154, an operating speed trace 155 is illustrated. Within the time of the axis illustrated in FIG. 7B, therefore, the machine system, or a rotary portion of the machine system being monitored is brought up to speed. As will be appreciated by those skilled in the art, machine systems will typically exhibit one or more operating speeds at which vibration levels are significantly elevated. Thus, in the illustration of FIG. 7B, a large peak develops as the machine system is brought up to speed (or conversely, as it is shut down).

As mentioned above, a number of alarm levels can be configured in the vibration monitor implementation of the present technique. Two such alarm levels 157 are illustrated in FIG. 7B. The alarm multiplier of the present technique permits these levels to be increased during certain periods of operation, typically during startup and shutdown, so as to avoid false alarms. In the graphical illustration of FIG. 7B, during a period from $t_1$ to $t_2$ spanning a range of speeds from RPM1 to RPM2, the multiplier is implemented to raise the alarm levels to levels 159. Thus, the peak that occurs within this speed range will not trigger an alarm. Such multipliers may be implemented to avoid such false alarms, either on a speed basis or on a time basis with the steady state alarm levels configured in the monitors being returned following either the preset time or as the system rises above the speed. Other schemes of multiplier implementation may, of course, be envisaged. The use of multipliers, therefore, allows the present system to conform to industry standard specifications, such as API 670, paragraph 5.4.2.5 and Appendix I.

As already mentioned, a number of alarms and alerts may be configured in a present implementation of a vibration monitor incorporating aspects of the present technique. For example, in a current implementation two channels are available in the vibration monitoring module, with 8 alarm settings being available per channel. The number and a name designation of each alarm may be set, along with parameters for enabling or disabling of each alarm. Conditions for response to the alarm settings may include "greater than," "less than," "inside range," "outside range," and various threshold settings for certain of these. Hysteresis settings may also be provided to prevent false alarms or to prevent clearing of an alarm. Similarly, threshold multipliers and startup periods may be set to prevent false alarms during periods of startup or transition of machinery through certain resonant frequencies.

Figure 8:
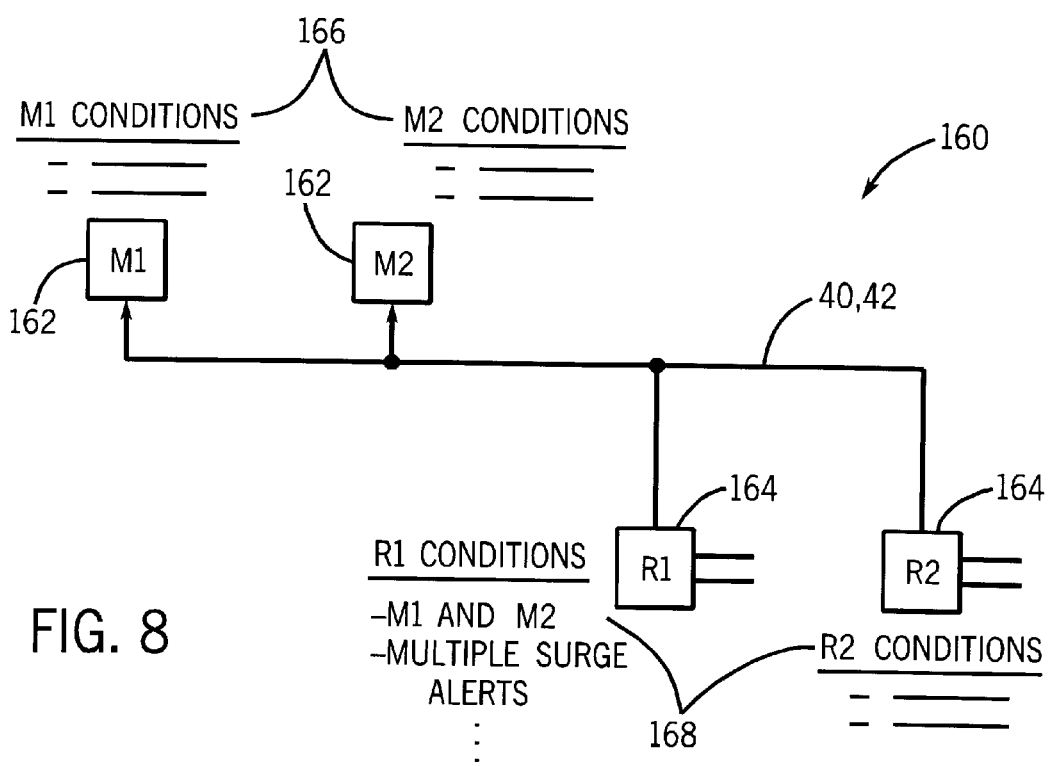
FIG. 8 is a diagrammatical representation of the interplay between program settings in a series of monitors and relay modules, such as for more complex voting logic schemes in accordance with aspects of the present technique.

As noted above, the code stored and executed within each monitoring module may be combined with that of other modules or with remote control equipment to create a voting logic structure which is extremely flexible and configurable. FIG. 8 illustrates generally an exemplary topology or hierarchy which may be established by virtue of this modularity and configurability. The logic scheme, indicated generally by reference numeral 160 may be thus distributed among devices, such as monitors 162 and integrated or physically separate relay circuits 164. The monitors, relay circuits and any other devices which contribute to such voting logic may be coupled through a network media 40 or 42 as described above. Configuration code within each monitoring module may then be implemented including programmably by a user, to account for analyzed data produced by the individual module, as well as data or signals from other modules.

In a present implementation, certain conditions may be programmed within each module as indicated generally at reference numeral 166. These conditions may include, by way of example, actual parameter levels or values, conditions such as whether an alarm or alert limit has been exceeded, the particular state of a device, sensor, transducer, or other input, and so forth. These conditions alone may suffice for commanding the change of state of an integrated or external relay circuit. However, the conditions may also be combined with other conditions monitored by other modules so as to define combinatorial logic and a voting logic structure stored either within the individual modules or, as indicated in FIG. 8, within the relay circuits. In the example of FIG. 8, the relay logic 168 may combine signals from two or more monitoring modules, such as to require a specific signal from more than one monitoring module, from one monitoring module but not another monitoring module, or multiple types of signals, such as surge alerts, before effecting a change of state. In general, such combinatorial logic may be based upon Boolean logic conditions which are programmed either within the monitoring modules or within the relay circuits. Owing to the high degree of modularity of the present system and its topology based upon the open industrial data exchange protocol, such voting logic is easily implemented and configurable both as a system is initially installed and as a system is altered (i.e. expanded or contracted).

By way of specific example, in a present implementation, each monitoring module designed to allow for control of a relay may store various configuration parameters for identifying and controlling the device. These may include a name and number of the relay, an enable and disable selection, and a latching setting (i.e. whether the relay stays in the alarm state when the signal causing the alarm has ended). Other settings may include "failsafe" operation settings and activation delay settings. The voting logic settings within each monitoring module may be based upon Boolean-type logic, such as "Alarm A or Alarm B," "Alarm A and Alarm B," or "Alarm A only." Based upon such conditions, multiple activation selections are possible to define the conditions that will cause the relay to activate, such as "normal," "alert," "danger," "disarm," "transducer fault," "module fault," and "tachometer fault."

As noted above, configuration code, including operating parameters, user-configurable parameters and values, alarm limits, alert limits, and the like, may be stored within each monitoring module for processing, monitoring, protection and control functions. In a present embodiment, such code may be stored in other devices as well to permit reconfiguration of individual monitors, in the event the monitoring modules are damaged, repaired, replaced. A present technique permits automatic device replacement and reconfiguration by storing the pre-set parameters for individual modules in a master module, with the individual module taking the role of a slave. It should be understood that in the present context the designation of master and slave do not necessarily reflect the control functions executed by or control hierarchy established between the individual components. Rather, for the reconfiguration purposes, the designation indicates only that the master stores the configuration parameters and can restore the configuration parameters in a slave when necessary.

Figure 9:
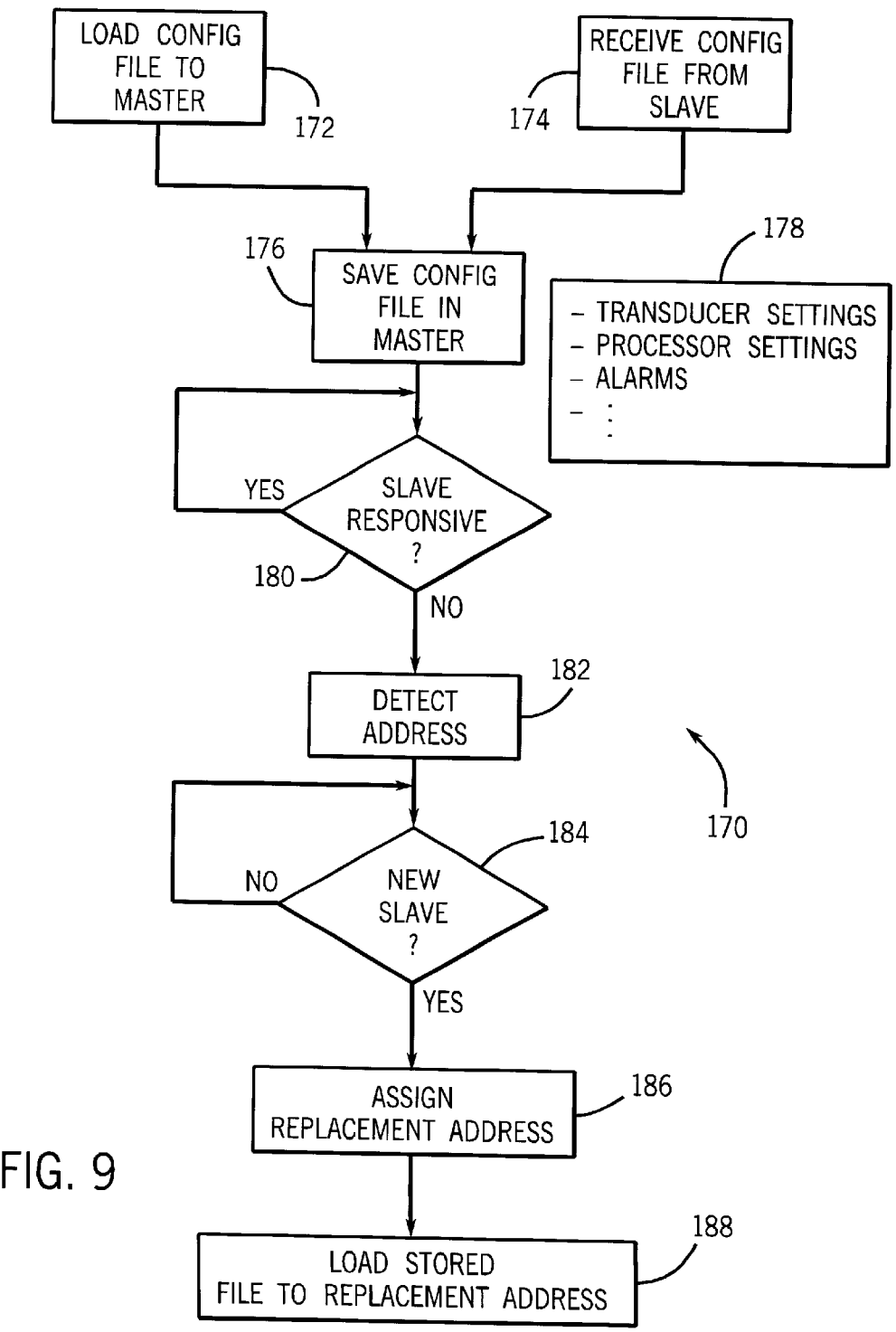
FIG. 9 is a flow chart illustrating an exemplary process for programming or re-programming configuration settings within a module in accordance with aspects of the present technique.

FIG. 9 generally represents certain steps in logic for implementing such automatic device replacement and reconfiguration. The logic, designated generally by reference numeral 170, begins after individual monitoring modules have been placed in service. The monitoring modules communicate among themselves in accordance with the open industrial data exchange protocol as described above. One of the modules, or another device, is designated as a master in a group, while other devices are designated as slaves. In a present embodiment, where a gateway is present in a monitoring group, the gateway will typically be employed as the master, with the monitoring modules themselves taking on the roles of slaves in the reconfiguration scheme. Certain monitoring modules may, where no such gateway is present, or where desired, take on the role of masters in this process.

In the summary of FIG. 9, the logic 170 begins at step 172 where a configuration file is loaded to a master, or at step 174 where the master receives the configuration file from a slave. In either case, the configuration parameters may include pre-set parameter values, as well as user-configurable values. Such user-configurable values may vary greatly depending upon the nature of the monitoring module and the functions it is to carry out in the system. In general, however, once the configuration file has been transmitted to the master it is stored in the master's memory circuitry as indicated by reference numeral 176.

In present embodiments, the configuration parameters of the files may include specific parameters needed for the processing, protection, control and reporting functions executed by the monitoring module. By way of example, the configuration parameters may include transducer settings, processor settings, alarms, comparison limits, ranges, and so forth. The entire file, as indicated generally by reference numeral 178 in FIG. 9, is then stored both in the slave and in the master in a redundant fashion.

Once so configured, the system is allowed to operate in its normal fashion. During such operation, the master periodically either polls the slave or determines by some other means that the slave is operational and responsive. Many techniques exist in the art for such monitoring of operational state. Once a slave has been determined to be unresponsive, as indicated at decision block 180 of FIG. 9, its address is detected by the master as indicated at reference numeral 182. Within the overall system architecture, the various slaves and masters may be independently and specifically addressed in accordance with the open industrial data exchange protocol. The address detected at step 182 permits the master to correlate which device has become unresponsive with a specific configuration file stored in its memory.

In the event the specific monitoring module or slave is replaced, the slave will receive a new address, such as assigned by the master, which may be a specific address in a sequence of available addresses. When a new or replacement module comes online, then, the master will determine whether the new module is a new slave, as indicated at reference numeral 184, based upon the address reported by the slave.

In the event of replacement, resetting, repowering, or any other event which would cause the loss of configuration data in a slave, the master may replace the configuration file once the new slave has been detected at step 184 of FIG. 9. In a present embodiment, the replacement is performed by assigning a new or replacement address to the slave in place of a default address as indicated at step 186, and by loading the configuration file stored within the master into the replacement address as indicated at step 188.

In actual implementation, when a new or replacement module, or the same module following servicing, is replaced in the system, the replacement module comes online at the default address. The master module changes the address of the replacement module from the default address to the address of the missing slave, that is, to the address detected for the unresponsive (e.g. removed) module. The master module then downloads the configuration corresponding to this address into the replacement module. Alternatively, the replacement module may be preprogrammed with the address of the missing module. In such situations, when the replacement module comes online at the missing module address, the configuration parameters are similarly downloaded by the master module. Thus, all necessary configuration parameters, including specific alarm limits, voting logic functionality, and so forth, are restored to the monitoring module of interest.

While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system for monitoring and protection of a machine, the system comprising:
   a sensor for detecting a dynamic operating parameter of the machine at a desired location of interest and for generating a signal representative thereof;
   a monitor disposed local to the location of interest and coupled to the sensor for receiving and processing the signal, the monitor including a memory for storing configuration settings for the processing of the received signal; and
   a master component disposed local to the monitor and coupled to the monitor for exchange of data in accordance with an open industrial data exchange protocol, the master component including a memory circuit for storing at least a portion of the configuration settings, whereby the configuration settings may be restored to the monitor or to a replacement monitor by transfer from the master component.

2. The system of claim 1, wherein the monitor is configured to process the received signal to derive vibrational data therefrom, and wherein the configuration settings include vibrational data settings.

3. The system of claim 2, wherein the configuration settings include alarm settings for different vibrational frequency bands.

4. The system of claim 1, wherein the configuration settings include alarm settings.

5. The system of claim 1, wherein the master component is a second monitor coupled to a second sensor for receiving and processing signals therefrom.

6. The system of claim 1, wherein the master component is a gateway configured to transmit data from the monitor to remote devices via a data exchange protocol different from the open industrial data exchange protocol.

7. The system of claim 1, wherein the monitor and the master component are disposed in a common enclosure local to the location of interest.

8. The system of claim 1, wherein the configuration parameters are user configurable.

9. The system of claim 1, wherein the monitor is configured to change an operative state of a relay based upon the configuration settings and the received signal.

10. The system of claim 9, wherein the relay is integrated into the monitor.

11. A system for monitoring and protection of a machine, the system comprising:
    a plurality of monitoring groups, each group including a sensor for detecting a dynamic operating parameter of the machine at a desired location of interest and for generating a signal representative thereof, a monitor disposed local to the location of interest and coupled to the sensor for receiving and processing the signal, the monitor including a memory for storing configuration settings for the processing of the received signal, and a master component disposed local to the monitor and coupled to the monitor for exchange of data in accordance with an open industrial data exchange protocol, the master component including a memory circuit for storing at least a portion of the configuration settings, whereby the configuration settings may be restored to the monitor or to a replacement monitor by transfer from the master component,
    wherein the monitoring groups are coupled to one another and configured to exchange data with one another in accordance with the open industrial data exchange protocol.

12. The system of claim 11, wherein each monitor is configured to process the received signal to derive vibrational data therefrom, and wherein the configuration settings include vibrational data settings.

13. The system of claim 12, wherein the configuration settings include alarm settings for different vibrational frequency bands.

14. The system of claim 11, wherein the configuration settings include alarm settings.

15. The system of claim 11, wherein at least one of the master components is a second monitor coupled to a second sensor for receiving and processing signals therefrom.

16. The system of claim 11, wherein at least one of the master components is a gateway configured to transmit data from the respective monitor to remote devices via a data exchange protocol different from the open industrial data exchange protocol.

17. The system of claim 11, wherein each monitor and respective master component are disposed in a common enclosure local to the respective location of interest.

18. The system of claim 11, wherein the configuration parameters are user configurable.

19. The system of claim 11, wherein each monitor is configured to change an operative state of a relay based upon the configuration settings and the respective received signal.

20. The system of claim 19, wherein each monitor includes a respective controlled relay integrated therein.

21. A system for monitoring and protection of a machine, the system comprising:
- a sensor for detecting a dynamic operating parameter of the machine at a desired location of interest and for generating a signal representative thereof;
- a monitor disposed local to the location of interest and coupled to the sensor for receiving and processing the signal and to derive vibrational data therefrom, the monitor including a memory for storing configuration settings for the processing of the received signal, the configuration settings including at least vibrational data settings; and
- a master component disposed local to the monitor and coupled to the monitor for exchange of data in accordance with an open industrial data exchange protocol, the master component including a memory circuit for storing at least a portion of the configuration settings, whereby the configuration settings may be restored to the monitor or to a replacement monitor by transfer from the master component.

22. The system of claim 21, wherein the configuration settings include alarm settings for different vibrational frequency bands.

23. The system of claim 21, wherein the configuration settings include alarm settings.

24. The system of claim 21, wherein the master component is a second monitor coupled to a second sensor for receiving and processing signals therefrom.

25. The system of claim 21, wherein the master component is a gateway configured to transmit data from the monitor to remote devices via a data exchange protocol different from the open industrial data exchange protocol.

26. The system of claim 21, wherein the monitor and the master component are disposed in a common enclosure local to the location of interest.

27. The system of claim 21, wherein the configuration parameters are user configurable.

28. The system of claim 21, wherein the monitor is configured to change an operative state of a relay based upon the configuration settings and the received signal.

29. The system of claim 28, wherein the relay is integrated into the monitor.

30. The system of claim 21, further comprising a second sensor coupled to a second monitor, the second monitor including a memory for storing second configuration settings; and a second master module coupled to the second monitor and including a memory for storing at least a portion of the second configuration settings, whereby the second configuration settings can be restored to the second monitor or to a replacement monitor by transfer from the second master component.

31. The system of claim 30, wherein the monitor and the second monitor are configured to exchange data in accordance with the open industrial data exchange protocol.

* * * * *